(12) United States Patent
Utsugi et al.

(10) Patent No.: US 11,513,473 B2
(45) Date of Patent: Nov. 29, 2022

(54) WAVEGUIDE, WAVEGUIDE MANUFACTURING APPARATUS, WAVEGUIDE MANUFACTURING METHOD, AND VIDEO DISPLAY DEVICE USING THE SAME

(71) Applicant: Hitachi-LG Data Storage, Inc., Tokyo (JP)

(72) Inventors: Takeru Utsugi, Tokyo (JP); Hiromichi Yamakawa, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 329 days.

(21) Appl. No.: 15/931,653

(22) Filed: May 14, 2020

(65) Prior Publication Data
US 2021/0055693 A1 Feb. 25, 2021

(30) Foreign Application Priority Data
Aug. 23, 2019 (JP) .............................. JP2019-152902

(51) Int. Cl.
*G03H 1/26* (2006.01)
*G02B 27/01* (2006.01)
*F21V 8/00* (2006.01)
*G03H 1/02* (2006.01)
*H04N 9/31* (2006.01)

(52) U.S. Cl.
CPC ............ *G03H 1/265* (2013.01); *G02B 6/005* (2013.01); *G02B 6/0053* (2013.01); *G02B 27/0172* (2013.01); *G03H 1/0248* (2013.01); *H04N 9/3182* (2013.01); *G02B 2027/0109* (2013.01); *G02B 2027/0123* (2013.01); *G02B 2027/0174* (2013.01); *G03H 2001/264* (2013.01); *G03H 2223/18* (2013.01); *G03H 2227/03* (2013.01)

(58) Field of Classification Search
None
See application file for complete search history.

(56) References Cited

U.S. PATENT DOCUMENTS

| 2007/0109943 | A1 | 5/2007 | Tsukagoshi et al. |
| 2016/0170215 | A1 | 6/2016 | Mukawa et al. |
| 2017/0059759 | A1 | 3/2017 | Ayres et al. |
| 2018/0143426 | A1 | 5/2018 | Ayres et al. |
| 2018/0210207 | A1* | 7/2018 | Machida ............ G02B 27/0176 |
| 2019/0278224 | A1 | 9/2019 | Schlottau et al. |

FOREIGN PATENT DOCUMENTS

| CN | 1774661 A | 5/2006 |
| CN | 1886785 A | 12/2006 |
| WO | 2017/176393 A1 | 10/2017 |

OTHER PUBLICATIONS

Chinese Office Action received in corresponding Chinese Application No. 202010645415.X dated Mar. 30, 2022.

* cited by examiner

*Primary Examiner* — Samira Monshi
(74) *Attorney, Agent, or Firm* — Mattingly & Malur, PC

(57) ABSTRACT

Provided is a waveguide having a light diffraction unit that diffracts incident light by a multiplex-recorded hologram, in which, in the light diffraction unit, a plurality of holograms having different angles with respect to an incident surface of the waveguide are formed, and when certain parallel light beams are incident, different wavelengths are diffracted by the plurality of holograms.

13 Claims, 14 Drawing Sheets

| | HOLOGRAM WITH NARROW PITCH | HOLOGRAM WITH WIDE PITCH |
|---|---|---|
| NO CORRECTION $\theta_g(\lambda_1) = \theta_g(\lambda_2)$ | | |
| CORRECTION $\theta_g(\lambda_1) \neq \theta_g(\lambda_2)$ | | |

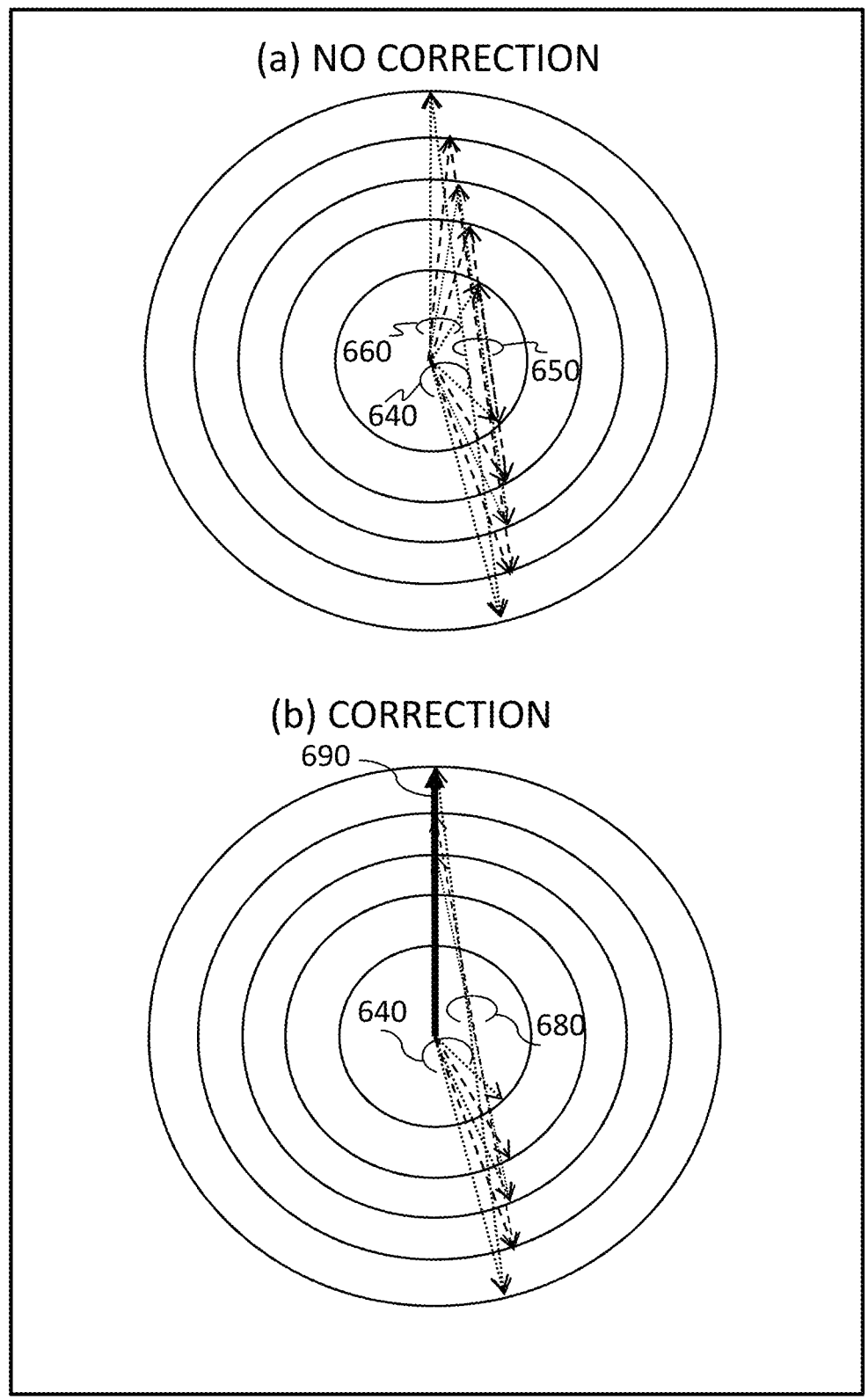

WAVEGUIDE, WAVEGUIDE MANUFACTURING APPARATUS, WAVEGUIDE MANUFACTURING METHOD, AND VIDEO DISPLAY DEVICE USING THE SAME

CROSS-REFERENCE TO RELATED APPLICATION

The present application claims priority from Japanese application JP2019-152902, filed on Aug. 23, 2019, the contents of which is hereby incorporated by reference into this application.

BACKGROUND OF THE INVENTION

1. Field of the Invention

The present invention relates to a waveguide used for a video display device such as a head mounted display.

2. Description of the Related Art

In a video display device such as a head mounted display (HMD), a waveguide is used as an optical system for propagating video light emitted from a projector (video projection unit) to eyes of a user. It is preferable that the waveguide used for the HMD is thin and has a wide field of view (FoV) for viewing a video. Although a half mirror can be used as the waveguide, it has been difficult to reduce the thickness in order to secure a wide field of view (FoV).

As the related art, there are US 2017/0,059,759 and US 2018/0,143,426. US 2017/0,059,759 and US 2018/0,143,426 disclose that a special mirror or a half mirror (called a "skew mirror" in these documents) in which a reflection axis has an inclination with respect to a surface normal line can be realized by using a hologram technique. If the skew mirror is used for the waveguide, the same function as that of the half mirror tilted with respect to the surface of the waveguide is realized, which it is effective in reducing the thickness of the waveguide and improving the FoV.

More specifically, US 2017/0,059,759 A discloses that the skew mirror does not have a constraint that the reflection axis is coincident with the surface normal line, light is reflected to a certain constant reflection axis over a relatively wide wavelength range, and a constant reflection axis over a relatively wide range of angles of incidence is provided. In addition, US 2018/0,143,426 A discloses a method of correcting color dispersion occurring in the waveguide.

Since the volume-type hologram having a light diffraction function is thin and has characteristics such as wavelength selectivity and angle selectivity, the hologram can selectively diffract light, and by employing the hologram for the waveguide of the HMD, it is possible to realize a thin waveguide having a wide FoV. In addition, by effectively utilizing the multiplex recording of the volume-type hologram, it is possible to display a high-quality and high-resolution video with less color unevenness, brightness unevenness, and the like, and it is also possible to realize low manufacturing costs and stable mass productivity. However, the waveguide of the HMD using the volume-type hologram has a problem of the color dispersion, which causes a problem of the occurrence of the color shift as a video display device. This problem will be described below.

First, the relationship between the skew mirror and the waveguide described in US 2017/0,059,759 and US 2018/0,143,426 will be described. In a case where a light beam is incident on the incident surface of the waveguide including the skew mirror, a portion of the light beam is reflected by the skew mirror surface having an inclination of a certain angle θg from the incident surface of the waveguide. Herein, when a light beam being propagated through the inside of the waveguide at an incident angle of a total reflection angle $θ_{TIR}$ (TIR: Total Internal Reflection) or more is allowed to be incident on the skew mirror, a portion of the light beam is reflected (diffracted) by the skew mirror surface and can be emitted to the outside of the waveguide (emitting coupler function). In addition, a light beam can be allowed to be incident from the outside of the waveguide and to be propagated through the inside of the waveguide by total reflection (incident coupler function). In this manner, the skew mirror has incident and emitting coupler functions in the waveguide. A waveguide in which this skew mirror is realized by a volume-type hologram is called a volume-type hologram waveguide.

Herein, the concept of the color dispersion of the volume-type hologram waveguide will be described. The color dispersion is a phenomenon in which the refractive index of a medium in optics differs depending on a wavelength, and thus, incident light beams are separated depending on respective wavelengths (the angles of the light beams differ depending on respective wavelengths), and in some cases, the color dispersion is also simply called dispersion. When light is refracted at the interface between media having different refractive indexes, the refractive indexes differ depending on the respective wavelengths, and thus, the color dispersion occurs. Therefore, the refraction angle at each wavelength can be calculated by using Snell's law. Due to the influence of the color dispersion, even if one white light beam is incident on the volume-type hologram waveguide, the light beams being propagated through the inside of the waveguide are propagated at different waveguide angles depending on the respective wavelengths. When this light is diffracted and emitted by the function of the volume-type hologram waveguide, the light is emitted with the color dispersion, so that one light beam is emitted at different angles depending on the respective wavelengths. Accordingly, the video separated according to the wavelength of light is visually recognized, and a color shift in the video occurs (the video is visually recognized with the position shifted depending on the color).

For this reason, for example, as one of applications of the HMD, in a case where an augmented reality (AR) for displaying a video on the external world in a superimposed manner and allowing the user to view the video is executed, a sense of presence is significantly reduced.

US 2017/0,059,759 A does not consider such a color shift, and US 2018/0,143,426 A describes a method of obtaining the angle of the interference fringes for correcting the color dispersion but does not describe a detailed configuration of a manufacturing apparatus.

SUMMARY OF THE INVENTION

The present invention has been made in view of such problems, and an object of the present invention is to provide a volume-type hologram waveguide with less color shift.

In view of the background art and problems described above, the present invention is to provide, for example, a waveguide having a light diffraction unit that diffracts incident light by a multiplex-recorded hologram, in which, in the light diffraction unit, a plurality of holograms having different angles with respect to an incident surface of the waveguide are formed, and when certain parallel light beams are incident, different wavelengths are diffracted by the plurality of holograms.

According to the present invention, a video with less color shift can be displayed on a waveguide having a light diffraction unit.

BRIEF DESCRIPTION OF THE DRAWINGS

FIG. 6C is k vectors in a case where there is no correction and a case where there is correction according to the first embodiment;

DETAILED DESCRIPTION OF THE PREFERRED EMBODIMENTS

Hereinafter, embodiments of the present invention will be described with reference to the drawings. In addition, the following embodiments, the case of a glasses-type HMD as a video display device will be described.

First Embodiment

[Configuration of Video Display Device]

Figure 1A:
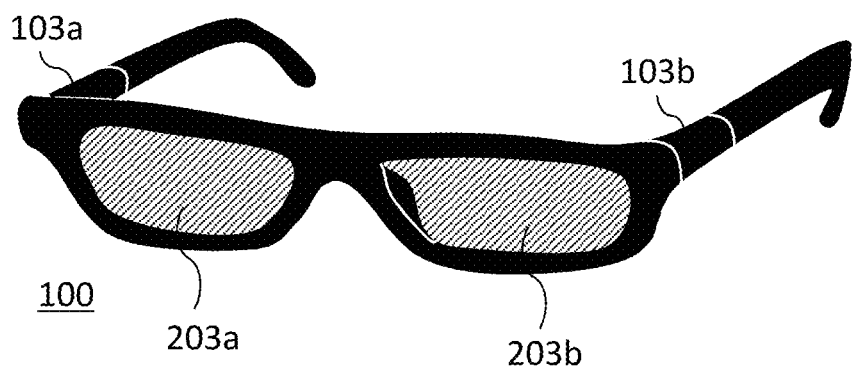
FIG. 1A is an outer appearance diagram of an HMD according to a first embodiment.
Figure 1B:
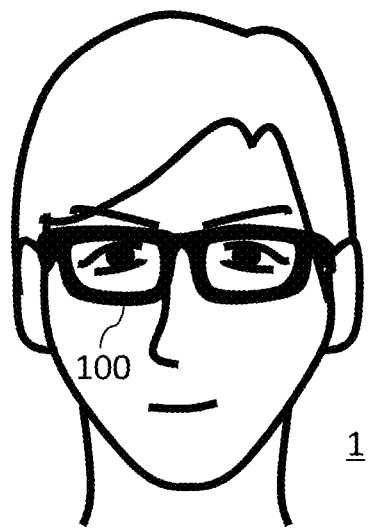
FIG. 1B is an outer appearance diagram illustrating a usage example of the HMD according to the first embodiment.

FIG. 1A is an outer appearance diagram of the HMD 100 according to the present embodiment. In addition, FIG. 1B is an outer appearance diagram illustrating a usage example of the HMD 100.

The glasses-type HMD 100 has a video projection unit 103a that projects a video to be displayed on the right eye of the user 1 and a video projection unit 103b that projects a video to be displayed on the left eye of the user 1 in a portion corresponding to the temple of the glasses. In addition, emitting couplers 203a and 203b that transmit the videos projected by the video projection units 103a and 103b to the eyes of the user 1 are provided in the portions corresponding to the lenses of the glasses. The emitting couplers 203a and 203b are configured not only to display a video but also to transmit light from the external world and can display an augmented reality (AR) for displaying the video on the external world in a superimposed manner and allowing the user to view the video. The user 1 can view the video with two eyes by wearing the HMD 100 on the head.

Figure 2:
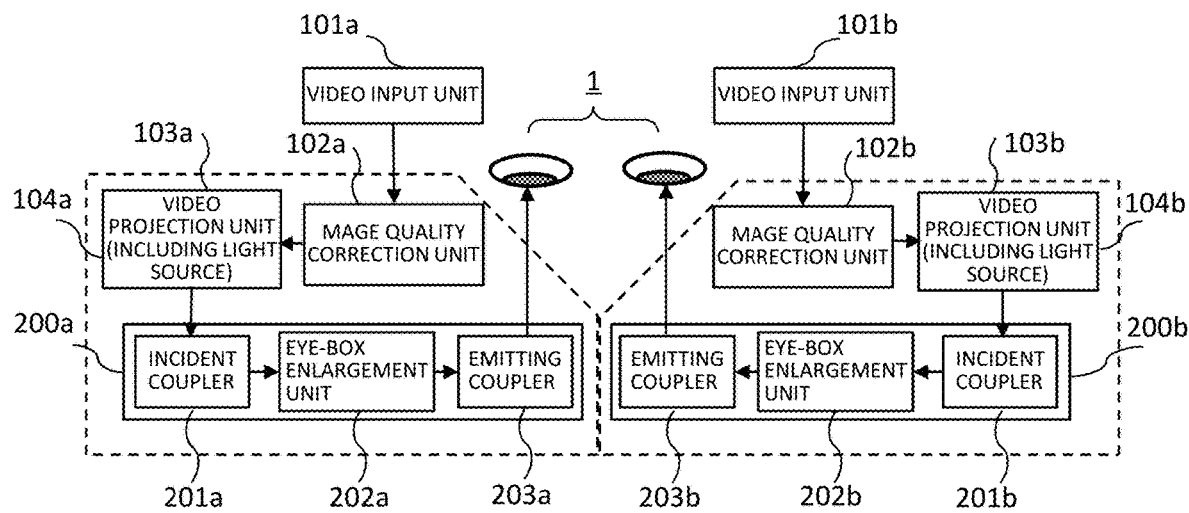
FIG. 2 is a block configuration diagram of the HMD according to the first embodiment.

FIG. 2 is a block diagram of the HMD 100 according to the present embodiment. The HMD 100 includes a right-eye video display unit 104a that displays a video on the right eye of the user and a left-eye video display unit 104b that displays a video on the left eye of the user. Since the two video display units have the same configuration for the right eye and the left eye, the following description will be made on the video display unit 104 in which "a" and "b" are omitted except the case of distinguishing between the right eye "a" and the left eye "b". In addition, in FIG. 2, other components are also denoted by reference numerals with "a" and "b" for the right eye and the left eye, and when the right eye and the left eye are not distinguished, "a" and "b" will be omitted.

The video display unit 104 first generates a video to be displayed by the image quality correction unit 102 and the video projection unit 103 on the basis of the video data transmitted from a video input unit 101. The image quality correction unit 102 corrects the color and brightness of the to-be-displayed video. Herein, adjustment is performed so that color unevenness, brightness unevenness, color shift, and the like are minimized. The video projection unit 103 is configured by using a small-sized projector including a light source and serves as an optical system that projects a virtual video of a video. That is, when the video projection unit 103 is directly viewed, a two-dimensional video can be viewed at a position at a certain distance. Herein, the distance at which the video (virtual video) is projected may be a certain finite distance or may be an infinite distance. However, since the display position of the video shifts at the time when visually recognizing the video while changing the position of the waveguide, in order to suppress the video from being viewed to be shaky, in the configuration of the present embodiment, it is preferable that the distance is infinite.

The video generated by the video projection unit 103 is emitted as a light beam group that projects a virtual video at a certain distance. This light beam group has wavelengths corresponding to at least three colors of red (R), green (G), and blue (B), and the user can view a color video.

The light beam group emitted from the video projection unit 103 is incident on the waveguide 200 through the incident coupler 201. The incident coupler 201 converts the direction of the light beam group incident on the waveguide into a direction in which the light beam group can be propagated through the inside of the waveguide 200 by total reflection. At this time, by performing the conversion while maintaining the relative relationship of the light beam directions of the light beam group, it is possible to display a high-definition video without distortion or blurring of the video.

The light beam group that is incident on the inside of the waveguide 200 is propagated by repeating total reflection and is incident on the eye-box enlargement unit 202. The eye-box enlargement unit 202 has a function of enlarging an eye-box (a region where a virtual video can be visually recognized) in which a user can view a video. If the eye-box is wide, it is difficult for the user to visually recognize the edge of the eye-box, which reduces stress, and also reduces the influence of a wearing state and individual difference in positions of the eyes of the user, so that it is possible to obtain a high sense of presence.

In the eye-box enlargement unit 202, the incident light beam group is duplicated while maintaining the relative relationship of the light beam directions and is emitted to the emitting coupler 203. That is, the light beam group emitted from the video projection unit 103 is spatially expanded while maintaining the relative relationship of the light beam directions (angles).

The emitting coupler 203 emits the incident light beam group to the outside of the waveguide 200 and transmits the light beam group to the eyes of the user 1. That is, contrary to the incident coupler 201, the emitting coupler 203 converts the direction of the incident light beam group into a direction in which the light beam group can be emitted to the outside of the waveguide 200.

The above-described configuration is substantially common to the right-eye video display unit 104a and the left-eye video display unit 104b. With the above-described configuration, the user 1 can view the video (virtual video) displayed on the two video display units 104a and 104b.

In the above-described HMD 100 of FIG. 1A, only the portion of the emitting coupler 203 that is a portion of the waveguide 200 is viewed, but the other portions of the waveguide 200 are hidden by the black frame so as not to be viewed from the outside. This is because when light (external light) of the external world is incident on the waveguide 200 from an unintended angle, the light is likely to be stray light and to deteriorate the image quality of the displayed video. Therefore, portions other than the emitting coupler 203 are allowed to be as invisible as possible from the external world so that external light is not allowed to be incident on the waveguide 200.

[Configuration of Waveguide]

Figure 3:
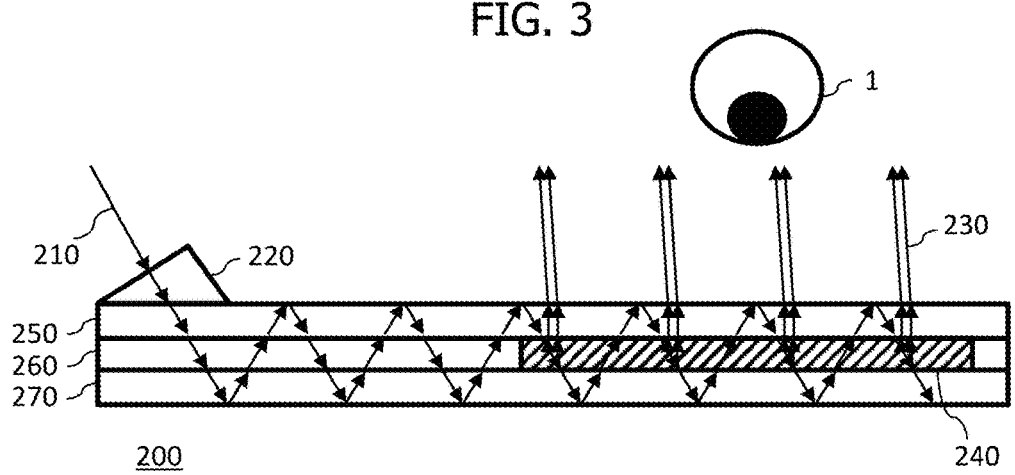
FIG. 3 is a schematic diagram illustrating an overall configuration of a waveguide according to the first embodiment.

FIG. 3 is a schematic diagram illustrating the overall configuration of the waveguide 200 according to the present embodiment. The waveguide 200 is configured with a transmission-type incident prism 220 which functions as an incident coupler, an eye-box enlargement unit, and a hologram portion 240 which functions as an emitting coupler, and these are accommodated in a substrate made of a synthetic resin such as a glass or a plastic, and the thickness is about 1 to 2 mm. For example, in FIG. 3, a three-layer structure of the cover layer 250, the medium layer 260, and the cover layer 270 is configured.

The light beam group (only the central light beam 210 is illustrated) emitted from the video projection unit 103 has a wide wavelength range corresponding to RGB lights and a wide angle range, and the light beam group is incident on the incident prism 220. FIG. 3 illustrates a path of a central light beam (hereinafter, referred to as incident light) 210 in the light beam group inside the waveguide 200. The incident light 210 is a light flux that corresponds to the pixel substantially at the center of the video to be displayed and has a finite thickness of actually several millimeters.

The hologram portion 240 is configured with a volume-type hologram which is a light diffraction unit, converts the direction of the incident light beam group, and emits the light beam group to the outside of the waveguide 200. Since the volume-type hologram diffracts a portion of the guided light, the rest of the light is guided as it is. By repeating this, a large number of emitting light beam groups 230 are duplicated in the plane, and the duplicated light beam group is emitted. Accordingly, the eye-box is enlarged laterally.

[Configuration of Waveguide (Variation)]

Figure 4A:
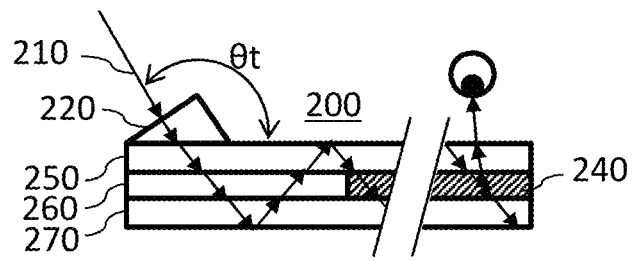
FIGS. 4A to 4D are configuration examples of an incident coupler portion according to the first embodiment.

FIGS. 4A to 4D illustrate configuration examples of the incident coupler portion according to the present embodiment. FIG. 4A illustrates a configuration (incident prism configuration) in which one transmission-type incident prism 220 is provided on the light incident side similar to the configuration illustrated in FIG. 3. This configuration is characterized in that the angle θt between the incident light beam and the waveguide 200 can be allowed to be relatively large.

Figure 4B:
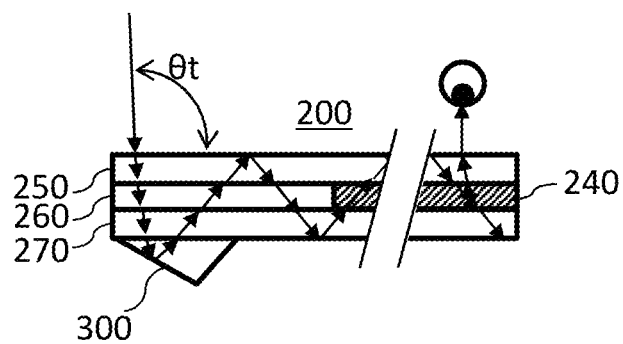

FIG. 4B illustrates a configuration (internal plane reflection prism configuration) in which one internal plane reflection prism 300 is provided on the side opposite to the light incident side. In this configuration, the incident light beam is reflected by the internal plane reflection prism 300 on which mirror coating or the like is performed and is guided at an angle. This configuration is characterized in that the angle θt between the incident light beam and the waveguide can be allowed to be relatively small.

Figure 4C:
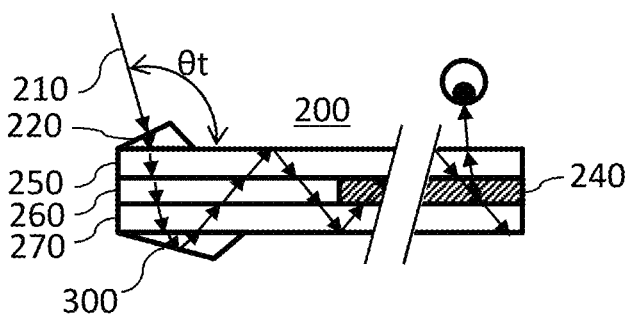

FIG. 4C illustrates a configuration using the incident prism 220 and the internal plane reflection prism 300, and this configuration is characterized in that the angle θt between the incident light beam and the waveguide can be a value between the two configurations of FIGS. 4(a) and 4(b) (incident+internal plane reflection prism configuration). With the above-described configuration, the waveguide has a high degree of design freedom of θt and the like, and the design can be selected depending on the designability and the application.

Figure 4D:
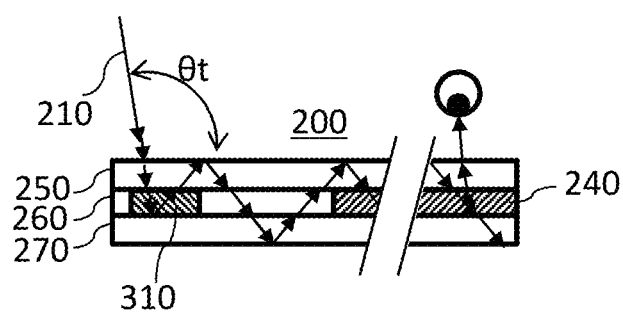

FIG. 4D illustrates a configuration in which an incident hologram 310 is used instead of the incident prism. A hologram that has substantially the same thickness as the hologram portion 240 of the emitting coupler and is recorded symmetrically is used. Similar to the internal plane reflection prism configuration, this configuration is characterized in the angle θt between the incident light beam and the waveguide can be allowed to be relatively small, and since an additional optical element such as a prism is not necessary, the configuration is simple, light-weighted, small-sized, and inexpensive. However, in this configuration, since it is necessary to form the holograms at two locations, the manufacturing cost is high, and in a case where the diffraction efficiency of the hologram on the light incident side is low, there is a problem that the optical efficiency of the waveguide is decreased (incident hologram configuration).

[Problem of Color Dispersion]

FIGS. 5A to 5D are diagrams describing the problem of color dispersion according to the present embodiment. First, a configuration in which the color dispersion becomes a problem will be described.

Figure 5A:
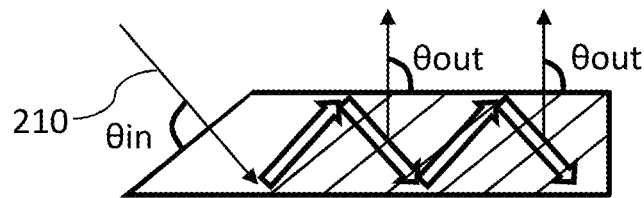
FIGS. 5A to 5D are diagrams describing a problem of color dispersion according to the first embodiment.

FIG. 5A illustrates a waveguide using a half beam splitter or the like, which is configured with elements having the same refractive index. In a case where such a large refractive index interface does not exist other than the interface between the air and the waveguide, if the incident angle θin to the waveguide and the emission angle θout from the waveguide are substantially the same (θin=θout), the video is not affected by the color dispersion (no color shift occurs).

This is because even if the medium constituting the waveguide has wavelength dispersion of the refractive index, the wavelength dispersion is canceled by refraction at the time of incidence and refraction at the time of emission. In addition, in a case where θin=θout=90°, it is possible to display a high-quality video without distortion or the like of the video. However, such a configuration has problems such as high manufacturing cost, difficulty in increasing FoV, and generation of stray light due to unintended reflection.

Figure 5B:
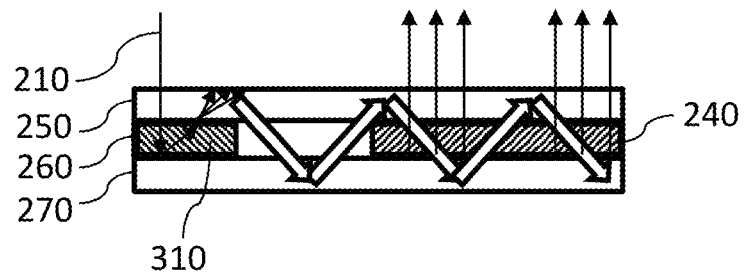

FIG. 5B also has a configuration that is not affected by color dispersion. This configuration is the above-described incident hologram configuration (FIG. 4D), and the incident light beam is diffracted by the incident hologram to form a waveguide angle. In this case, due to the refractive index difference between the cover layer 250 and the medium layer 260, the color dispersion occurs at the time of refraction at the interface, and the angle is changed depending on the wavelength of the light. The refraction angle is represented by Formula (1) according to Snell's law.

[Formula 1]

$$\theta_2(\lambda) = \sin^{-1}\left(\frac{n_1(\lambda)}{n_2(\lambda)} \sin \theta_1\right) \quad (1)$$

Herein, $n_1(\lambda)$ and $n_2(\lambda)$ are the refractive indexes of the medium before and after the refraction, and are represented as a function of the wavelength $\lambda$. In addition, $\theta_1$ is the incident angle to the refractive index interface before the refraction, and $\theta_2$ is the refraction angle. According to this Formula, light beams incident at the same incident angle $\theta_1$ also change the refraction angle due to the wavelength dependency of the refractive index at the interface with different refractive indexes, and thus, the color dispersion occurs. The color dispersion is more remarkable as the incident angle is larger. However, in this configuration, the color dispersion occurs when the light is propagated through the cover layers 250 and 270, and the color dispersion hardly occurs when the light is propagated through the medium layer 260. Since the medium layer 260 has no color dispersion when the light is diffracted by the hologram portion 240, the emitting light beam is hardly affected by color dispersion.

Figure 5C:
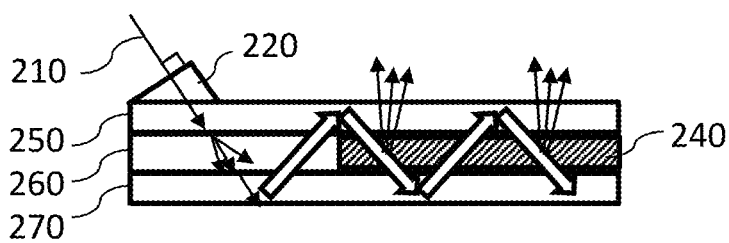

On the other hand, FIG. 5C illustrates a configuration affected by the color dispersion. In this configuration, the incident light 210 is vertically incident on the incident prism 220. In the case of the vertical incidence, the color dispersion does not occur ($\theta_1$=0 in Formula 1). After that, the incident light 210 is refracted at the interface between the cover layer having the same refractive index distribution as that of the incident prism 220 and the medium layer having a different refractive index. At this time the, color dispersion occurs. The light being propagated through the waveguide is propagated in a state where the medium layer has color dispersion and the cover layer has no color dispersion. Then, when the light is diffracted by the hologram portion 240 and emitted to the outside of the waveguide, the light beam having the color dispersion is emitted as it is, and the video is affected by the color dispersion, so that the color shift occurs.

Figure 5D:
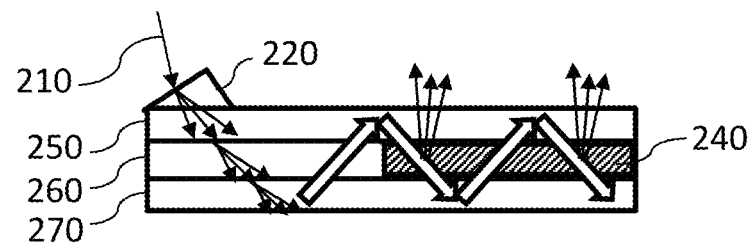

Similarly, FIG. 5D also has a configuration in which the color dispersion occurs. In this configuration, since the light is configured not to be vertically incident on the incident prism 220, first, the color dispersion occurs due to the refraction at the interface between the air and the incident prism 220. Then, the color dispersion occurs in the interfaces of the refractive index in the waveguide such as the interface between the incident prism 220 and the cover layer 250, the interface between the cover layer 250 and the medium layer 260, and the interface between the medium layer 260 and the cover layer 270. Since the color dispersion also occurs in the hologram portion 240, the color shift occurs due to the influence of color dispersion even when the light is emitted to the outside of the waveguide due to the diffraction.

Similarly, the problem of the color shift due to the influence of color dispersion occurs in the configurations of FIGS. 4A to 4C. In addition, similarly to the configuration of FIG. 5B, the configuration of FIG. 4D is not affected by the color dispersion.

In addition, in a case where the ratios of the wavelength dependency of the refractive indexes of the medium layer and the cover layer before and after the refraction are substantially the same, since $n_1(\lambda)/n_2(\lambda)$ in the Formula (1) becomes a constant value, there is no influence of the color dispersion, and no problem of the color shift occurs. That is, the ratios of the wavelength dependency of the refractive index before and after the refraction are different, and when the incident angle is large, the color dispersion remarkably occurs. And, furthermore, in a case were the color dispersion occurs in the same layer (medium layer) as the hologram portion that diffracts light, the color shift of the video occurs.

[Concept of Color Dispersion Correction Technique]

Figures 6A, 6B:
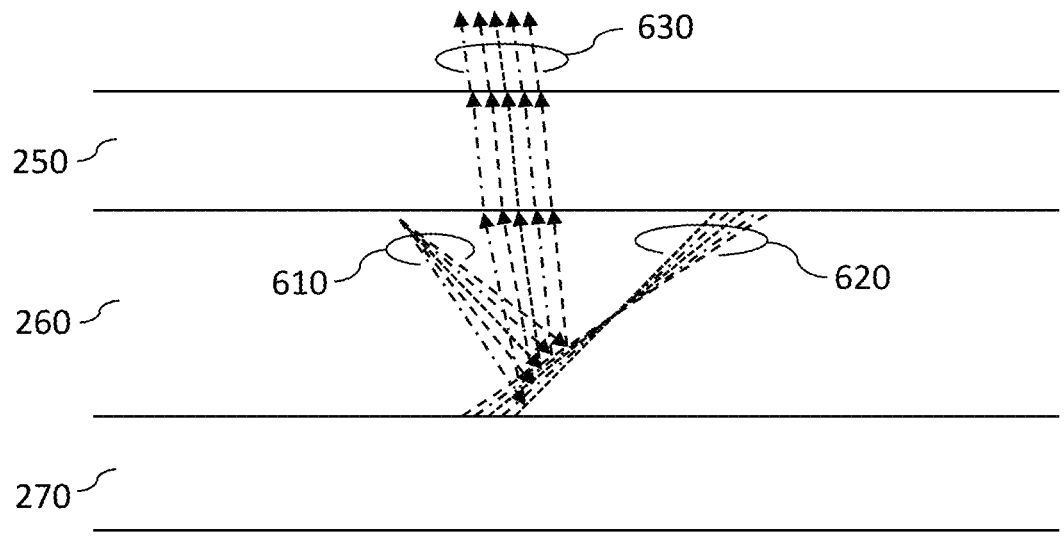
FIG. 6A is a diagram describing an outline of a color dispersion correction technique according to the first embodiment.
FIG. 6B is a schematic diagram of propagation of light in a case where there is no color dispersion correction and a case where there is color dispersion correction in each of a hologram with a narrow pitch and a hologram with a wide pitch according to the first embodiment.

A method for solving the above-described problem will be described. FIG. 6A is a diagram describing the outline of the color dispersion correction technique according to the present embodiment. The above-described problem of the color shift occurs in a case where the color dispersion occurs in the light beams being propagated through the inside of the medium layer 260 (610). For this reason, as illustrated in FIG. 6A, by changing the angle of the hologram diffracted according to the wavelength so as to correct the color dispersion (620), the light at the time of emission becomes parallel (630). Herein, each line of the hologram 620 indicates a line parallel to the constant refractive index surface (skew mirror surface) of the volume-type hologram.

The light beam of each wavelength is diffracted by a hologram satisfying the Bragg matching condition. For this reason, the light beams of different wavelengths are diffracted by holograms with different pitches. The holograms with different pitches are formed by sequentially recording by multiplex recording. At the time of the multiplex recording, the color shift can be reduced by changing the angle of the hologram to be recorded.

This method can be used only for a certain light beam, and in principle, this method cannot be applied to all light beams with a wide angle range emitted from the projector. However, the color shift of the entire video can be reduced by correcting the color shift of the light beam substantially at the center of the video.

FIG. 6B is a schematic diagram of propagation of light in a case where there is no color dispersion correction and a case where there is color dispersion correction in each of a hologram with a narrow pitch and a hologram with a wide pitch in the present embodiment. In FIG. 6B, lights of different wavelengths $\lambda_1$ and $\lambda_2$ are propagated in the medium layer at different angles due to the color dispersion. In a case where in a case where there is no correction, since the light is diffracted by holograms having the same angle but different pitches, the lights having different angles are diffracted at different angles, so that the color shift occurs in the video. On the other hand, in a case where there is correction, since the light is diffracted by holograms having different angles and pitches, the lights having different angles can also be diffracted at the same angle, so that a video with reduced color shift can be displayed. Herein, the angle of the hologram that Bragg-matches at a certain wavelength λ is represented by θg(λ).

FIG. 6C illustrates a k vector (wave vector) in a case where there is no correction and a case where there is correction according to the present embodiment. In FIG. 6C, five wavelengths are described. In a case where there is no correction, as illustrated in (a), the color-dispersed incident light 640 is diffracted by the hologram vectors (650) having the same angle (being parallel), and thus, diffracted light 660 having different angles occur. On the other hand, in a case where there is correction, as illustrated in (b), the color-dispersed incident light 640 is diffracted by the hologram vectors (680) having different angles, and thus, diffracted light 690 having the same angle is emitted.

Figure 6D:
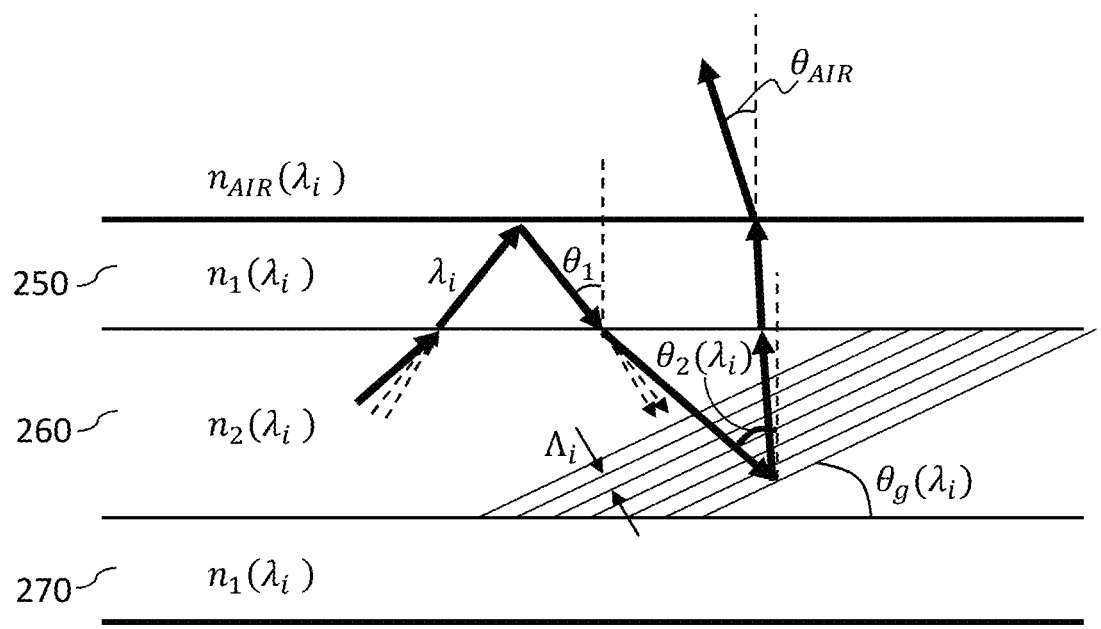
FIG. 6D is an explanatory diagram for determining an angle θg of a hologram according to the first embodiment.

FIG. 6D is an explanatory diagram for determining the angle θg of the hologram according to the present embodiment. As illustrated in FIG. 6D, the angle θg($\lambda_i$) of the hologram that Bragg-matches at a certain wavelength $\lambda_i$ is calculated by the following Formula (2) from the refractive index $n_1(\lambda_i)$ at the wavelength $\lambda_i$ of the cover layers 250 and 270, the refractive index $n_2(\lambda_i)$ at the wavelength $\lambda_i$ of the medium layer 260, and the incident angle $\theta_1$ of the light on the cover layers 250 and 270. Herein, it is assumed that there is no color dispersion in the cover layer and the color dispersion occurs in the medium layer, and the emission angle $\theta_{AIR}$ of the diffracted light from the medium is 0 degrees. In addition, $\theta_2(\lambda_i)$ is a light beam angle (incident angle to the waveguide surface) of each wavelength $\lambda_i$ in the medium layer 260.

[Formula 2]

$$\theta_g(\lambda_i) = \frac{1}{2}\theta_2(\lambda_i) = \frac{1}{2}\sin^{-1}\left(\frac{n_1(\lambda_i)}{n_2(\lambda_i)}\sin\theta_1\right) \quad (2)$$

In addition, in a case where the emission angle $\theta_{AIR}$ of the diffracted light from the medium is not 0 degrees, the following Formula (3) is obtained.

[Formula 3]

$$\theta_g(\lambda_i) = \frac{1}{2}\left(\sin^{-1}\left(\frac{n_{AIR}(\lambda_i)}{n_2(\lambda_i)}\sin\theta_{AIR}\right) + \sin^{-1}\left(\frac{n_1(\lambda_i)}{n_2(\lambda_i)}\sin\theta_1\right)\right) \quad (3)$$

In addition, the pitch $\Lambda_i$ of this hologram can be obtained as the following Formula (4) from the Bragg matching condition.

[Formula 4]

$$\Lambda_i = \frac{\lambda_i}{2n_2(\lambda_i)\sin(\theta_2(\lambda_i) - \theta_g(\lambda_i))} = \frac{\lambda_i}{2n_2(\lambda_i)\sin\left(\frac{1}{2}\theta_2(\lambda_i)\right)} \quad (4)$$

Figure 6E:
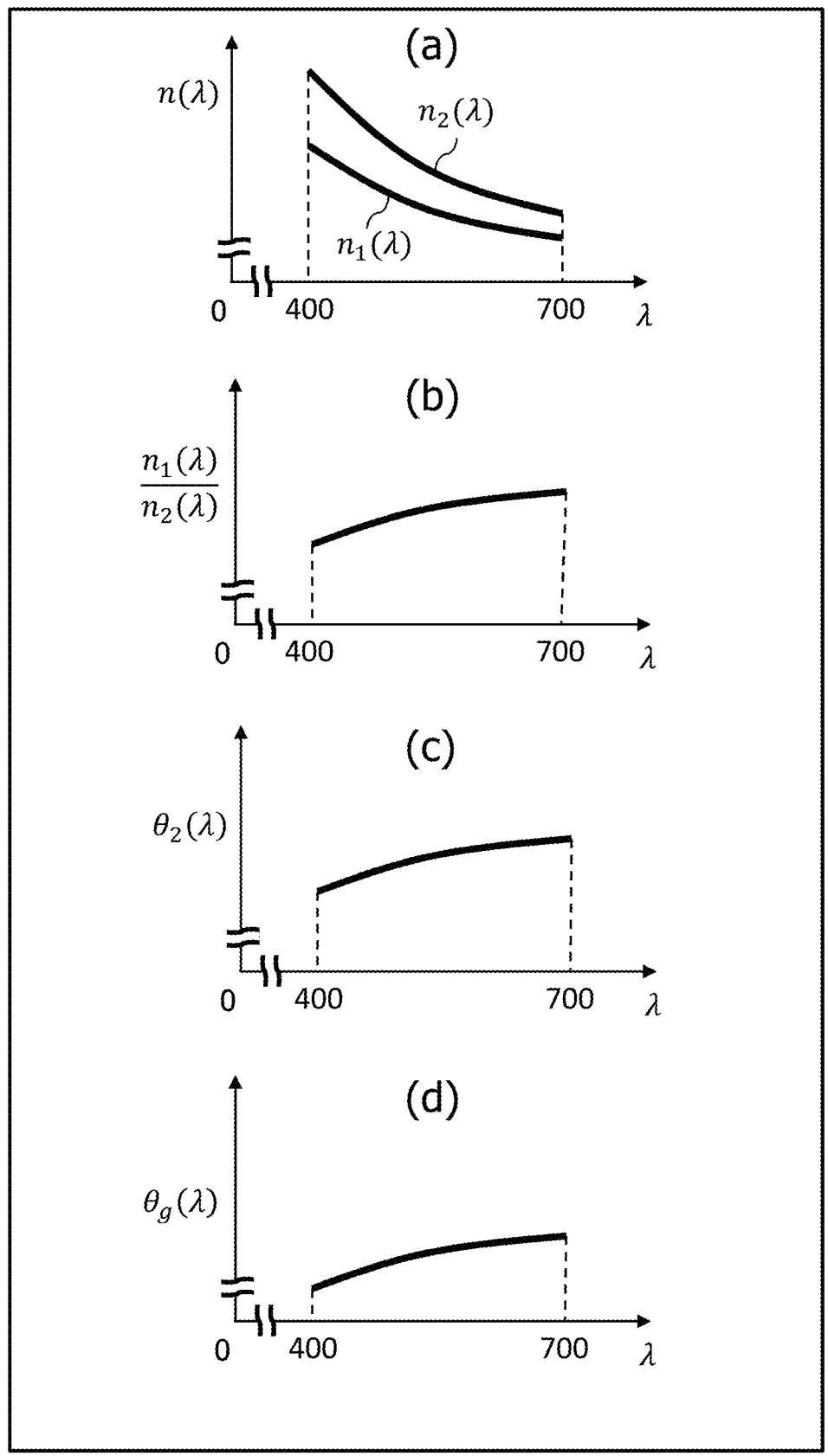
FIG. 6E is a schematic diagram illustrating wavelength dependency of each parameter according to the first embodiment.

FIG. 6E is a schematic diagram illustrating the wavelength dependency of each parameter according to the present embodiment. In FIG. 6E, (a) is a schematic view of the wavelength dependency of the refractive index. In addition, (b) illustrates the wavelength dependency of the refractive index ratio $n_1/n_2$ between the cover layer and the medium layer. Thus, in a case where the ratio is not constant, the light angle $\theta_2$ of the medium layer is not constant ((c) of FIG. 6E), and the angle θg of the hologram to be formed is also not constant according to Formula (2) ((d) of FIG. 6E). In this manner, by forming holograms with non-constant angles, it is possible to reduce the color shift due to the color dispersion.

[Manufacturing Method]

Figure 7A:
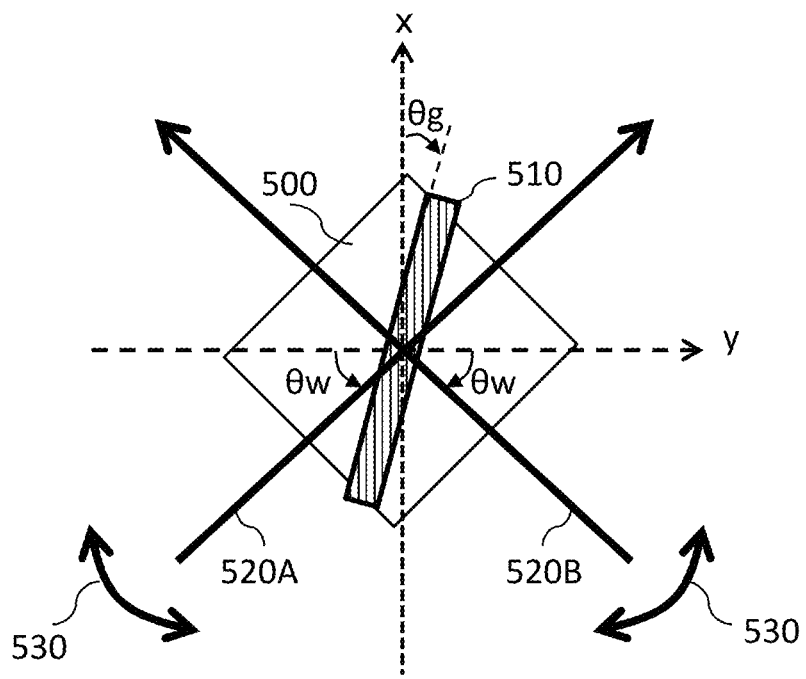
FIGS. 7A and 7B are diagrams describing a method of manufacturing the volume-type hologram according to the first embodiment.
Figure 7B:
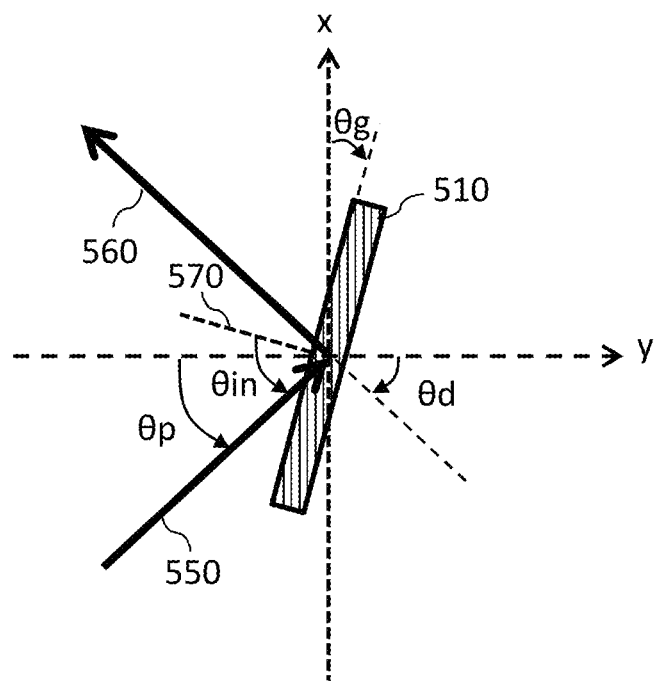

FIGS. 7A and 7B are diagrams describing the manufacturing method of the volume-type hologram according to the present embodiment. In FIG. 7A, the volume-type hologram can be manufactured by recording, as a hologram, interference fringes formed by recording lights 520A and 520B emitted from a light source having high coherence such as laser light on a recording medium 510 of a photopolymer or the like which is a photosensitive material. Herein, as illustrated in FIG. 7A, the z-axis is defined in the direction perpendicular to the x-axis, the y-axis, and the paper surface. The recording lights 520A and 520B are both parallel lights that are tilted by θw (recording angle) from the y-axis in line symmetry with respect to the x-axis. Accordingly, the interference fringe plane is formed parallel to the x-z plane. In addition, the recording medium 510 is tilted by θg from the x-z plane. In addition, in FIG. 7A, for the facilitation of illustration, the recording medium is tilted by θg with respect to the x-axis, but in the manufacturing apparatus described later, the recording medium is tilted by θg with respect to the y-axis. By tilting by θg with respect to the y-axis, the incident angles of the two recording lights 520A and 520B to the exposure area and the recording medium can be allowed to be equal, and thus, high-efficient recording can be performed.

Since the interference fringe plane is the reflection plane (skew mirror surface) of the waveguide, θg is the inclination of the reflection plane from the recording medium surface. In addition, the recording prism 500 is used in order to avoid a decrease in light use efficiency during the recording due to the surface reflection of the recording medium and an influence of the refraction on the recording medium 510.

As illustrated by an arrow 530, the recording lights 520A and 520B are rotated around the z-axis as the center of rotation, and the angle formed by the recording lights 520A and 520B is changed to perform the multiplex recording. Herein, the recording lights can always be allowed to be line symmetric with respect to the x-axis, so that the interference fringe plane can always be allowed to be parallel to the x-z plane. Accordingly, the interference fringe plane (reflection plane) can be fixed while being tilted by θg from the recording medium surface, and thus, the holograms having different interference fringe pitches can be multiplex-recorded.

FIG. 7B illustrates an optical arrangement in the case of reproducing the volume-type hologram which is multiplex-recorded by the above-described method. Herein, the term "reproduction" denotes irradiating a hologram with incident light to diffract the light and will be used later as this meaning.

In FIG. 7B, a reproducing light beam 550 tilted by θp (reproducing angle) from the y-axis direction is incident on the volume-type hologram (the incident angle with respect to the medium is θin=θp+θg, which is called a reproducing incident angle), and in a case where Bragg selectivity is satisfied, the diffracted light 560 is emitted at an angle tilted by θd from the y-axis. In a case where the reproducing light beam has a wide wavelength range corresponding to the RGB lights and a wide angle range corresponding to the FoV, if the light can be diffracted by the volume-type hologram, the volume-type hologram can be used as an emitting coupler of the waveguide. In addition, since the wavelength of the light beam is integrated and recognized by the eyes of the observer by a color matching function, the wavelength distribution of the emitting light beam from the volume-type hologram is not necessarily the same as the wavelength distribution of the incident light beam, but in the wavelength distribution of the emitting light beam, at least the wavelengths corresponding to the three colors of RGB may be included in a well-balanced manner. Herein, the above-described θg, θw, θp, θd, and θin are all described as angles within the recording medium 510.

[Configuration of Manufacturing Apparatus]

Figure 8:
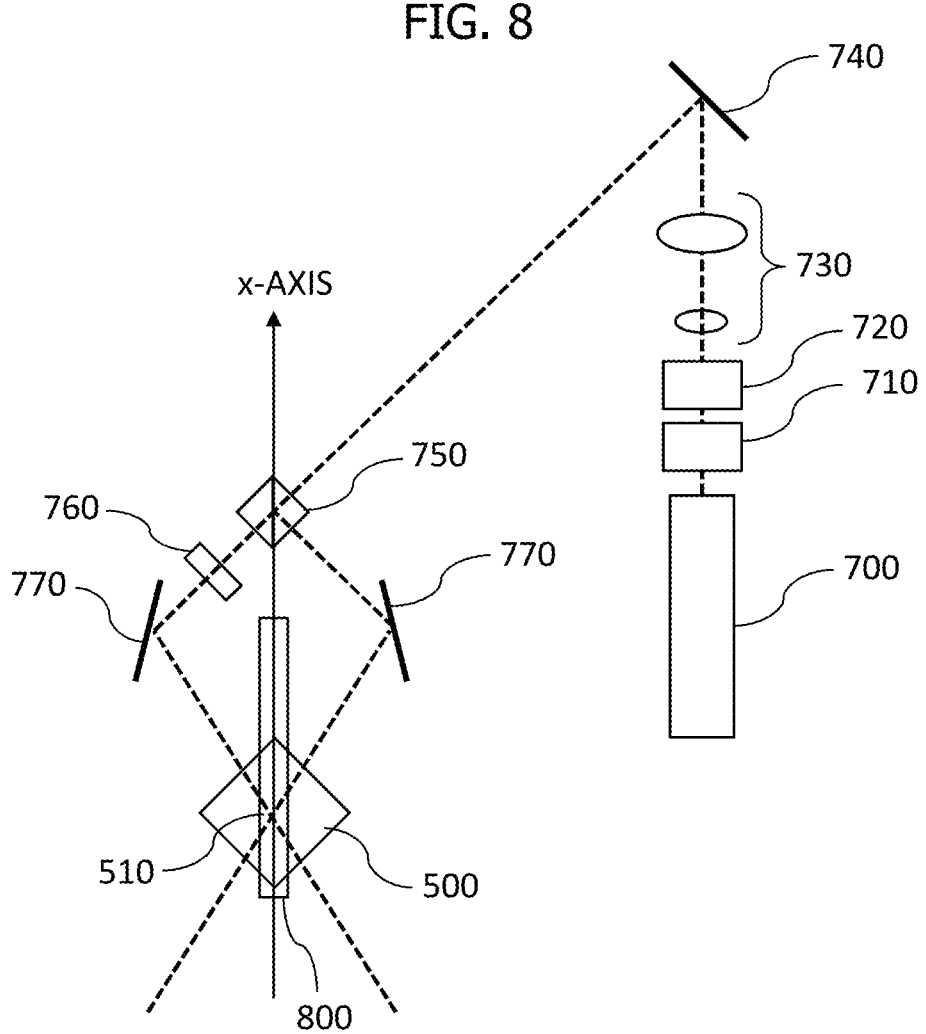
FIG. 8 is a configuration diagram of an outline of a waveguide manufacturing apparatus according to the first embodiment.

FIG. 8 is a configuration diagram of an outline of the waveguide manufacturing apparatus according to the present embodiment. In FIG. 8, light emitted from a laser 700 as a light source unit passes through a shutter 710 and a half wave plate (HWP) 720, a light flux diameter is expanded by a beam expander 730, and after being folded back by a mirror 740, and the light is split by a polarizing beam splitter (PBS) 750 which is a light splitting unit so as to have an intensity ratio of about 1:1. The two split lights become S-polarized light (polarization direction perpendicular to the paper surface) by the HWP 760 and are incident on the recording prism 500 so as to intersect again by the mirror 770 which is a light reflection unit. The mirror 770 is mounted on a rotating stage and can be rotated in line symmetry with respect to the x-axis. The two lights interfere with each other in the recording medium 510 interposed by the recording prism 500 to form the interference fringes. By recording the interference fringes on the recording medium 510, the volume-type hologram is recorded. In addition, the multiplex recording is performed by changing the pitch of the interference fringes to be recorded by rotating the mirror 770. At this time, by rotating the mirror 770, the position where the recording light beams intersect moves on the x-axis the multiplex recording is performed by moving the recording prism 500 and the recording medium 510 by the uniaxial (x-axis) stage 800 so as to follow the movement of the position.

Figure 9A:
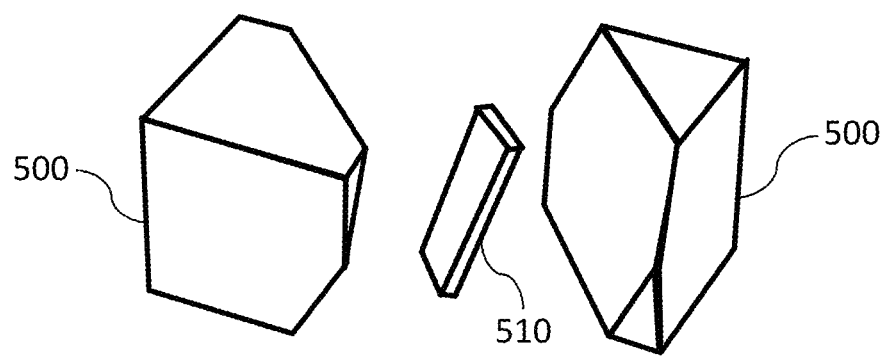
FIGS. 9A and 9B are schematic configuration diagrams of a recording prism and a recording medium according to the first embodiment.
Figure 9B:
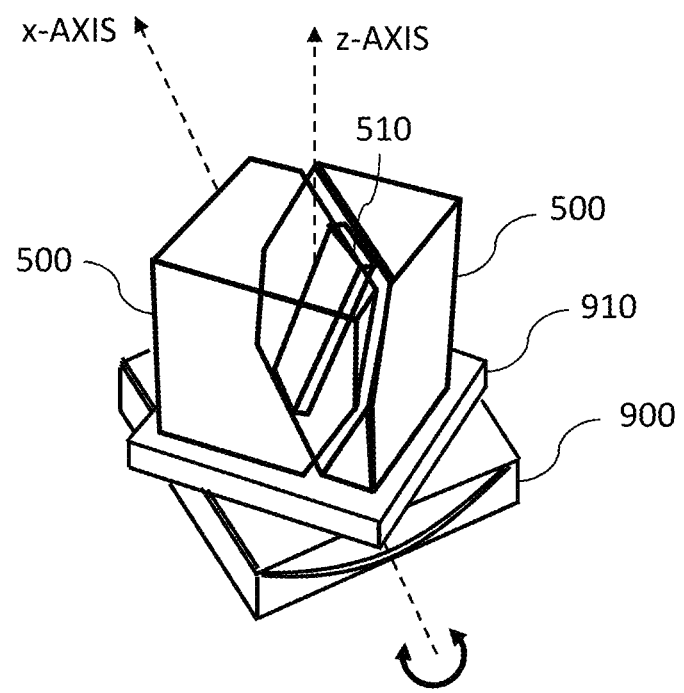

FIGS. 9A and 9B are schematic configuration diagrams of the recording prism and the recording medium according to the present embodiment. FIG. 9A is a schematic diagram illustrating the positional relationship between the recording prism and the recording medium. The recording prism 500 has a shape in which a cubic glass is obliquely cut to be divided into two portions. The recording medium 510 is configured to be interposed between the two recording prisms 500. An index matching oil is filled between the recording medium 510 and the recording prism 500 to eliminate an air layer (gap), so that reflection and the like in the place is suppressed.

FIG. 9B is a schematic configuration diagram of the recording prism and the periphery at the time of recording. The recording prism 500 is fixed to a pedestal 910, and the pedestal 910 is fixed to a gonio stage 900 which is a rotation mechanism. The gonio stage 900 can tilt the pedestal in the rotation direction around the x-axis. Accordingly, the recording prism 500 and the recording medium 510 can be tilted by a desired angle to record interference fringes. In other words, the central axis (x-axis) of the gonio stage 900, which is the rotation mechanism, exists on the interference fringe plane. By using this function, the interference fringes (hologram) are recorded at an angle for correcting the color dispersion in each multiplex recording (tilted by $\theta g(\lambda_i)$ in Formula (2) and Formula (3) from the waveguide surface).

[Realizing Method of Correction Technique]

Figure 10:
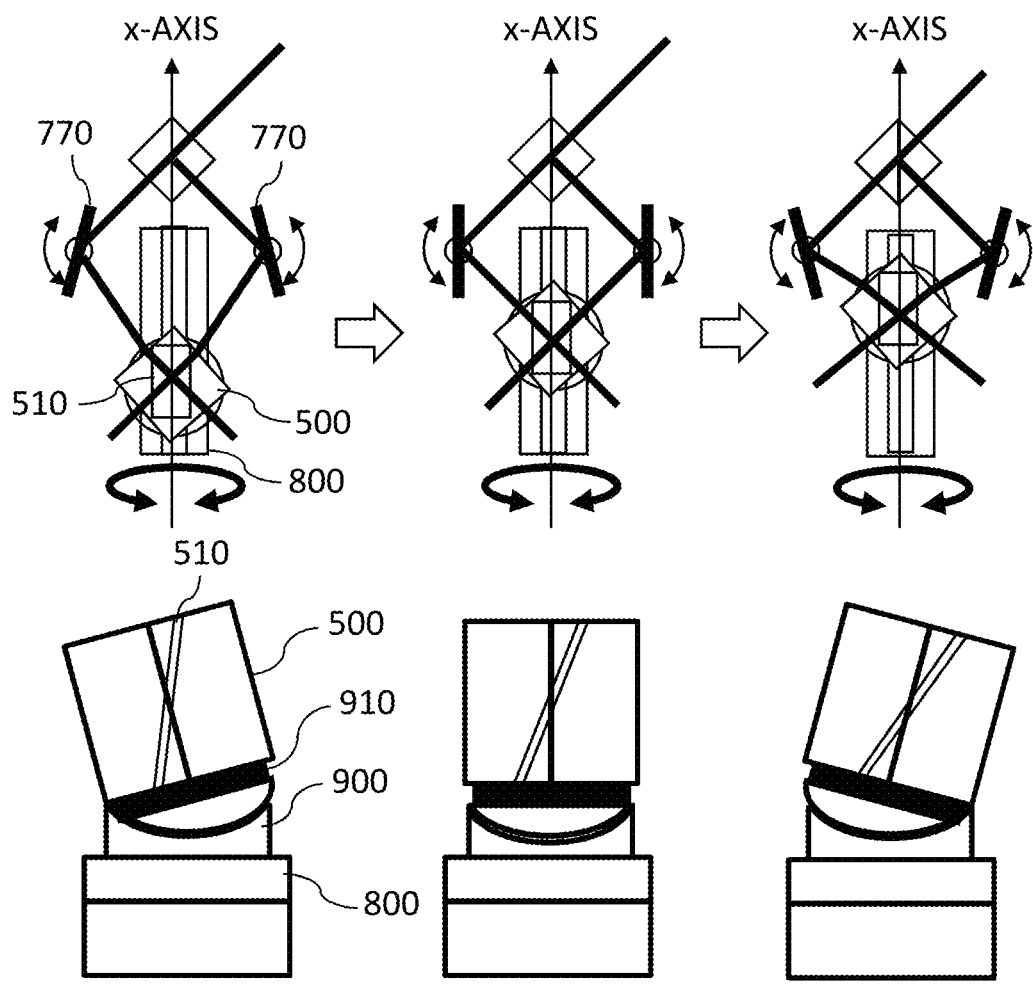
FIG. 10 is a diagram describing a method of recording a hologram for correcting color dispersion according to the first embodiment.

FIG. 10 is a diagram describing a hologram recording method for correcting the color dispersion according to the present embodiment. In FIG. 10, the upper portion is a diagram of the recording prism 500 and the recording medium 510 as viewed from the z-axis direction, and the lower portion is a diagram as viewed from the x-axis direction.

In order to correct the color dispersion as described above, it is necessary to record the interference fringes (holograms) having different pitches on the recording medium at different angles. Therefore, during each multiplex recording, the interference fringes can be allowed to be recorded at a desired angle by not only the rotation of the mirror 770 but also the tilting of the recording prism 500 and the recording medium 510 by using the gonio stage 900. Since the incident light is refracted by the recording prism 500 and the recording medium 510, in advance in consideration of this refraction, the two light beam angles (vectors) of the light beams in the recording medium 510 are calculated, and the angle between the formed interference fringes (hologram) and the recording medium is obtained. Accordingly, it is possible to obtain the rotation angle of the gonio stage 900 required to record the hologram at a desired angle during each multiplex recording. In addition, as indicated by the white arrow, since the position where the recording light beams intersect moves on the x-axis due to the rotation of the mirror 770, the multiplex recording is performed by moving the recording prism 500 and the recording medium 510 by the uniaxial stage 800 so as to follow the movement of the position.

[Examples of Experiment Results]

Figure 11A:
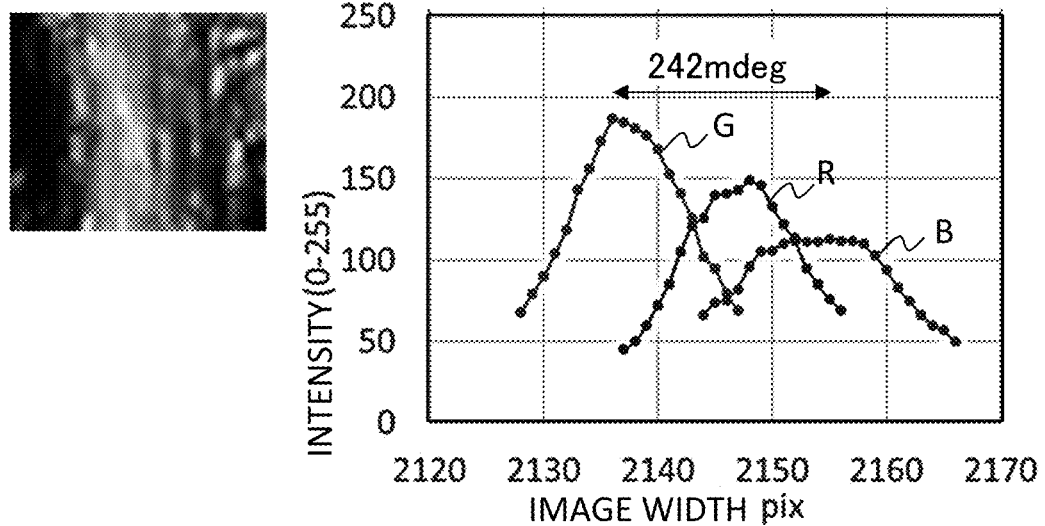
FIGS. 11A and 11B are examples of experiment results of the effect of reducing color shift of the waveguide according to the first embodiment.
Figure 11B:
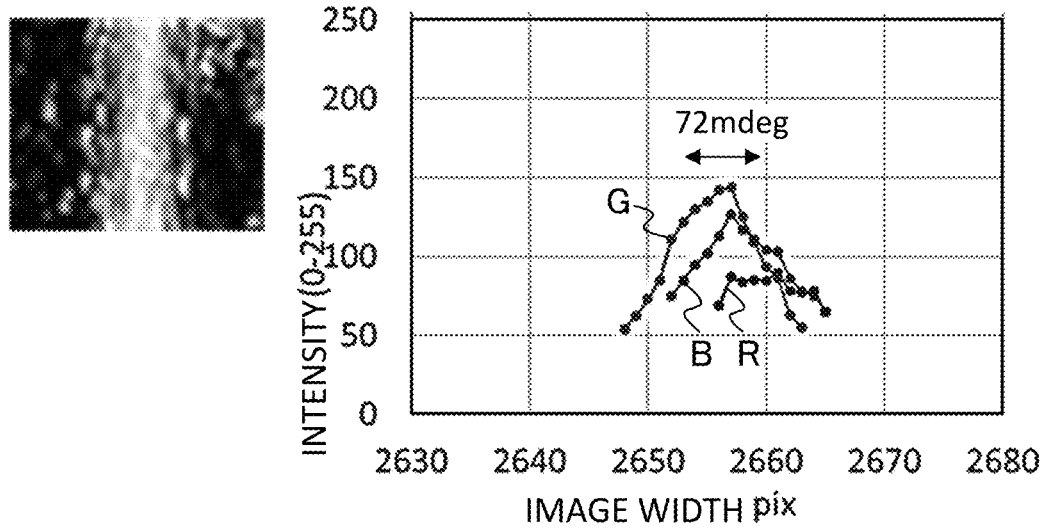

FIGS. 11A and 11B illustrate examples of an experiment result of the effect of reducing the color shift of the waveguide according to the present embodiment. FIG. 11A illustrates an experiment result in a case where there is no correction and is a cross-sectional view of an image when a video displaying one white vertical line is viewed through a waveguide and the intensity data. It can be understood that the three colors of RGB are separated by about 242 mm and a color shift occurs. On the other hand, FIG. 11B is an experiment result in a case where there is correction, and one white vertical line is correctly displayed, and the amount of color shift is greatly reduced to about 72 mm. From the above description, the effect of reducing the color shift has been verified by this method.

As described above, according to the present embodiment, it is possible to display a video with less color shift on the waveguide having the light diffraction unit.

Second Embodiment

In the present embodiment, a waveguide manufacturing apparatus having a configuration different from that of the first embodiment will be described.

Figure 12:
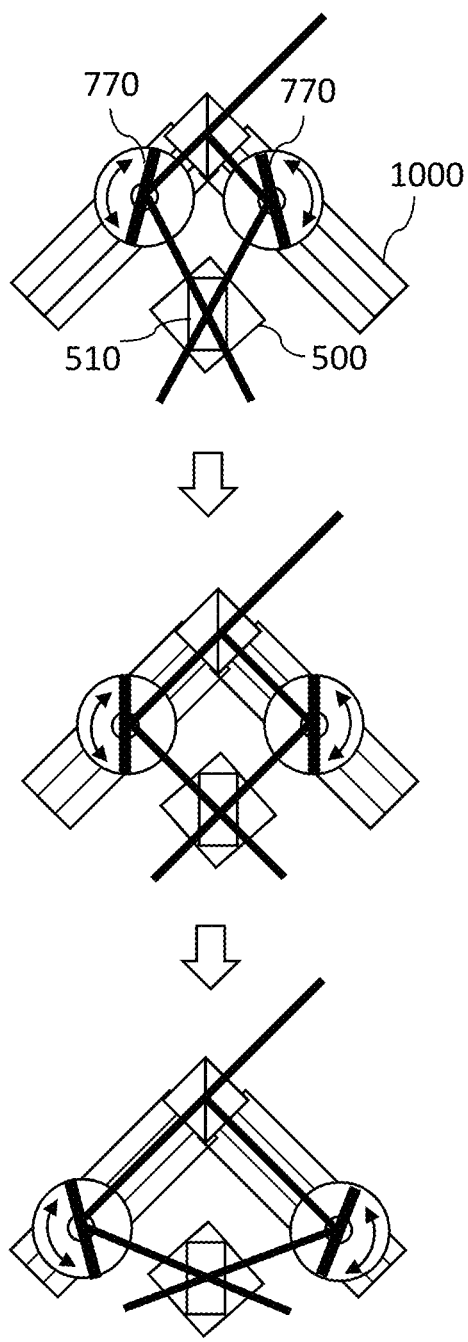
FIG. 12 is a diagram describing a configuration of a waveguide manufacturing apparatus according to a second embodiment.

FIG. 12 is a diagram describing a configuration of the waveguide manufacturing apparatus according to the present embodiment. In FIG. 12, the same components as those in FIG. 10 are denoted by the same reference numerals, and the description thereof will be omitted. FIG. 12 is different from FIG. 10 in that the mirror 770 is arranged on the uniaxial stage 1000 and the positions of the recording prism 500 and the recording medium 510 are fixed. Accordingly, as indicated by white arrow, the mirror 770 is allowed to move on the uniaxial stage 1000 so that, even if the position where the recording light beams intersect each other changes due to the rotation of the mirror 770, the intersecting position is coincident with the same position of the recording prism 500 and the recording medium 510.

Accordingly, it is not necessary to move the recording prism 500 and the recording medium 510 on the uniaxial stage during the recording, and thus, it is possible to reduce the influence of vibration and the like during the recording. In addition, the gonio stage for performing color dispersion correction is attached to the recording prism 500 or below the mirror 770. Accordingly, it is possible to perform high-speed recording highly stably.

Although the embodiments have been described above, the present invention is not limited to the above-described embodiments but includes various modifications. For example, the above-described embodiments have been described in detail for the purpose of describing the present invention in an easy-to-understand manner, and thus, the embodiments are not necessarily limited to having all the configurations described. In addition, a portion of the configurations of a certain embodiment can be replaced with the configurations of another embodiment, and the configuration of another embodiment can be added to the configuration of a certain embodiment. In addition, with respect to a portion of the configurations of each embodiment, addition, deletion, or replacement of other configurations is available.

What is claimed is:

1. A waveguide comprising a light diffraction unit that diffracts incident light by a multiplex-recorded hologram,
   wherein, in the light diffraction unit, a plurality of holograms having different angles with respect to an incident surface of the waveguide are formed, and when certain parallel light beams are incident, different wavelengths are diffracted by the plurality of holograms, and
   wherein the waveguide further comprises a transmission-type incident prism and an internal plane reflection prism.

2. The waveguide according to claim 1, further comprising a transmission-type incident prism.

3. The waveguide according to claim 1, further comprising an internal plane reflection prism.

4. The waveguide according to claim 1, wherein the light diffraction unit has a two-layer structure of at least a cover layer and a medium layer, and a ratio of wavelength dependency of refractive indexes of the cover layer and the medium layer is not constant.

5. A manufacturing apparatus for a waveguide having a light diffraction unit that diffracts incident light by a multiplex-recorded hologram, comprising:
   a light source unit;
   a light splitting unit;
   a light reflection unit;
   a recording prism; and
   a recording medium interposed between the recording prism,
   wherein lights split by the light splitting unit intersect again by rotation of the light reflection unit to form an interference fringe plane that is multiplex-recorded in the recording medium, and
   wherein the recording prism has a rotation mechanism, and a central axis of the rotation mechanism is in the interference fringe plane.

6. The waveguide manufacturing apparatus according to claim 5, wherein the rotation mechanism is a gonio stage.

7. The waveguide manufacturing apparatus according to claim 5, further comprising a uniaxial stage that moves positions of the recording prism to a position where the lights split by the light splitting unit that moves by the rotation of the light reflection unit intersect.

8. The waveguide manufacturing apparatus according to claim 5, further comprising a uniaxial stage that moves the light reflection unit so as to move positions of the recording medium to a position where the lights split by the light splitting unit that moves by the rotation of the light reflection unit intersect.

9. A method of manufacturing a waveguide having a light diffraction unit that diffracts incident light by a multiplex-recorded hologram, comprising:
   forming interference fringes which are multiplex-recorded in a recording medium interposed by recording prism by allowing two recording lights to intersect by rotation of a light reflection unit; and
   recording the interference fringes at a desired angle by tilting the recording medium in a rotation direction around an axis in a plane of the interference fringes.

10. The method of manufacturing a waveguide according to claim 9, wherein a position of the recording medium is moved to a position where the recording lights that move by the rotation of the light reflection unit intersect.

11. The method of manufacturing a waveguide according to claim 9, wherein the light reflection unit is moved so that a position of the recording medium is moved to a position where the recording lights that move by the rotation of the light reflection unit intersect.

12. A video display device comprising:
   a video input unit;
   an image quality correction unit that corrects color and brightness of a video to be displayed on the basis of a video data transmitted from the video input unit; and
   a video projection unit that emits video light corrected by the image quality correction unit,
   wherein the waveguide according to claim 1 is used as an optical system for propagating the video light emitted from the video projection unit to eyes of a user.

13. A waveguide comprising a light diffraction unit that diffracts incident light by a multiplex-recorded hologram,
   wherein, in the light diffraction unit, a plurality of holograms having different angles with respect to an incident surface of the waveguide are formed, and when certain parallel light beams are incident, different wavelengths are diffracted by the plurality of holograms, and
   wherein the light diffraction unit has a two-layer structure of at least a cover layer and a medium layer, and a ratio of wavelength dependency of refractive indexes of the cover layer and the medium layer is not constant.

* * * * *